United States Patent [19]

Kolb, Jr.

[11] 4,232,275
[45] Nov. 4, 1980

[54] ADJUSTABLE MIRROR MOUNT FOR A LASER

[75] Inventor: William P. Kolb, Jr., Carlsbad, Calif.

[73] Assignee: Hughes Aircraft Company, Culver City, Calif.

[21] Appl. No.: 959,391

[22] Filed: Nov. 9, 1978

[51] Int. Cl.³ .............................................. H01S 3/086
[52] U.S. Cl. ........................ 331/94.5 D; 331/94.5 C
[58] Field of Search ................... 331/94.5 C, 94.5 D; 350/288

[56] References Cited

U.S. PATENT DOCUMENTS

| | | | |
|---|---|---|---|
| 3,826,998 | 7/1974 | Kindl et al. | 331/94.5 C |
| 3,864,029 | 2/1975 | Mohler | 331/94.5 C |
| 3,883,820 | 5/1975 | Burns et al. | 331/94.5 C |
| 3,953,113 | 4/1976 | Shull | 331/94.5 D |

*Primary Examiner*—William L. Sikes
*Attorney, Agent, or Firm*—W. H. MacAllister; G. L. Cline; E. N. Kramsky

[57] ABSTRACT

A low cost improved adjustable mirror mount is disclosed. The adjustable mirror mount includes an inner cylindrical member one end of which is sealed to a laser tube and a mirror is mounted to the other end. The midsection circumference of the inner cylindrical member may be thinner in order that it be easily deflected about its axis. An outer cylindrical member is coaxial to and surrounds the inner cylindrical member. A plurality of adjustment screws are radially disposed at the end of the outer member for deflecting the inner cylindrical member and the mirror. Thus, the angle of the mirror to the axis of the laser discharge tube is very accurately adjusted.

6 Claims, 3 Drawing Figures

PRIOR ART

ADJUSTABLE MIRROR MOUNT FOR A LASER

BACKGROUND OF THE INVENTION

1. Field of the Invention

The invention relates generally to gas lasers and in particular relates to an improved adjustable mirror assembly for a laser.

2. Description of the Prior Art

Lasers have highly reflective mirrors located at either end of a lasing medium for stimulating light emissions and reflecting those emissions between them. Various schemes have been devised to permit alignment of these reflective mirrors relative to the axis of the laser plasma tube. Initially, the mirrors were mounted outside the evacuated plasma tube, which was usually terminated with Brewster windows, and placed in separate housings which were mechanically referenced or aligned to the laser plasma tube.

Gas lasers are generally constructed by two techniques; the first technique utilizes a plasma tube bottle in which windows (usually Brewster angle windows) are attached to the vacuum envelope and in which the regenerative cavity mirrors are supported externally to the bottle. It is a relatively uncomplicated matter to align and adjust the externally mounted mirrors. If the mirrors are properly aligned, the laser will function, and function well. If not, however, either the laser will not function at all or function only minimally.

It is desirable to have a mirror assembly which is an integral part of the laser plasma tube, not just an appendage as some prior art lasers, in order to provide a more compact package. Also, an integrated plasma tube and mirror combination provides a more stable arrangement.

In the second technique, generally referred to as the "internal mirror" method, laser mirrors are attached directly to cylindrical metal housings at either end of the plasma tube which, in turn, are sealed to the vacuum bottle. The mirrors at either end complete the vacuum envelope. Each mirror is usually deposited on a cylindrical glass substrate which is sealed in place with a glass frit or glass solder by placing the entire laser tube assembly in a 450° C. oven.

More and more the laser industry is turning to the internal mirror technique even though such a technique poses certain problems. In order to hard seal the mirrors into place, they must be either pre-aligned to the bore of the resonant or laser cavity before sealing or must be aligned after sealing, i.e., while the laser is in operation. Pre and post sealing alignment has been a difficult proposition.

One of the leading devices for adjusting a laser internal mirror is the well known mirror mount fitting according to U.S. Pat. No. 3,826,998. The mirror mount fitting includes a metal member having a weakened wall corrugation formed circumferentially therearound with a window closing the outer end of the fitting. The inner end of the fitting is made integral with the end of the laser tube and the reflecting mirror is formed on the closing window itself. The corrugation or single bellows-type formation on the fitting may extend inwardly or outwardly of the tube axis and is substantially weaker and of substantially lesser thickness than the remainder of the fitting wall. The fitting may be deformed at the corrugation such that the yield point of the material is exceeded to a sufficient extent to adjust the mirror to a desired position relative to the tube axis. There are several limitations of such a device. A drawback of this prior art device is that the corrugation must be deformed beyond the elastic limit of the material so that the mirror will be set in place and not moved. Another undesirable feature is that the plastically deformed cylinder must be shielded from being bumped or jarred because the deformed area is weak and the cylinder may easily be deflected if bumped.

Another prior art device is a mirror holder assembly composed of two cylindrical members which are axially assembled together to form a gas tight seal at the joint. One end of the mirror holder assembly is attached to the plasma discharge tube while a mirror is mounted to the other end. Each of the cylindrical members has a flange which is perpendicular to the axis of the cylinders and the two flanges are separated by 0.10 inch from each other. Screws extend through one of the flanges and press against the other flange. To adjust the mirror, the leverage of the screws is used to tilt the endmost cylinder thereby adjusting the alignment of the mirror. Such a device, although providing highly accurate and precise mirror adjustments, is costly to machine.

SUMMARY OF THE INVENTION

Accordingly, it is an object of the present invention to provide a laser having an improved, economical, and more reliable mounting for a mirror.

It is another object of the present invention to provide a laser with an adjustable mirror mounting.

It is still another object of the present invention to provide an anode assembly for accurately adjusting a mirror.

In accordance with the foregoing, an adjustable mirror mount includes an inner cylindrical member one end of which is attachable to a laser tube, the other of which is for mounting a mirror. An outer member surrounds the inner cylindrical member and is annularly separated therefrom. A plurality of radially disposed lever means extend through the outer member and impinge upon the inner cylindrical member for deflecting said inner member thereby adjusting the mirror.

DETAILED DESCRIPTION OF THE DRAWINGS

Figure 1:
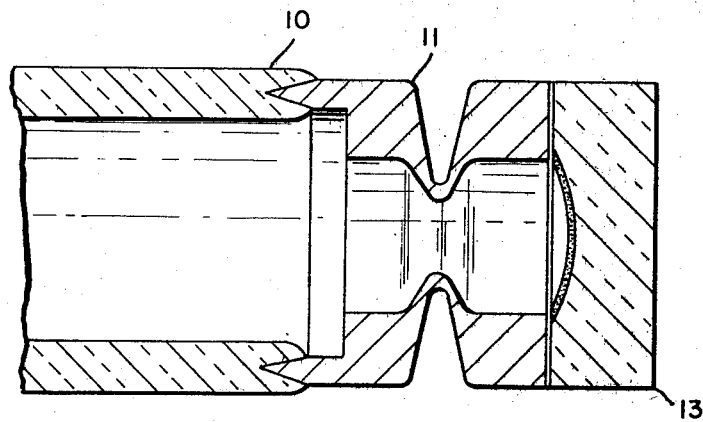
FIG. 1 is a cross-sectional view of a prior art device.

Referring more specifically to FIG. 1, a well-known prior art device, according to U.S. Pat. No. 3,826,998, for mounting a mirror to a laser tube is briefly described. The laser includes a quartz or glass laser discharge tube 10 having a cylindrical metal mount 11 fused at one end of the tube 10. A glass substrate 13, having a mirror deposited on one face, is sealed to the other end of the metal mount 11. The metal mount 11 has a corrugation approximately at its mid-section and the wall thickness of that corrugation is reduced. Coaxial pressure applied to the mirror mount 11 causes the mount to deform at the corrugation as its elastic limit is exceeded, thereby adjusting the mirror. Although such a device is simple to manufacture, the accuracy and permanence of mirror alignment could be improved.

Figure 2:
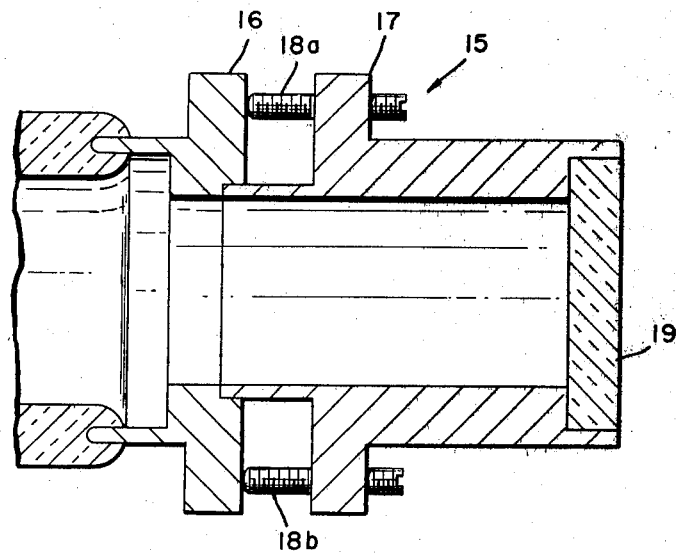
FIG. 2 is a cross-sectional view of another prior art device.

Briefly, FIG. 2 illustrates another prior art mirror adjustment device heretofore utilized by the assignee of the present invention. The assembly 15 includes first and second cylindrical members 16 and 17, respectively, which are joined together for forming a gas tight seal. Alternatively the assembly may be made of one piece instead of two. Both of the cylindrical members have parallel flanges which are facing together and spaced apart by a small distance. The mirror 19 is mounted at one end of the second cylindrical member 17. The adjustment screws 18a and 18b, extending through the flange of member 17, are used to align the mirror 19 by deflecting the cylindrical member 17 about its axis and about the axis of the discharge plasma tube. This device permits precise adjustment of the mirror 19. However, it is expensive to manufacture.

Figure 3:
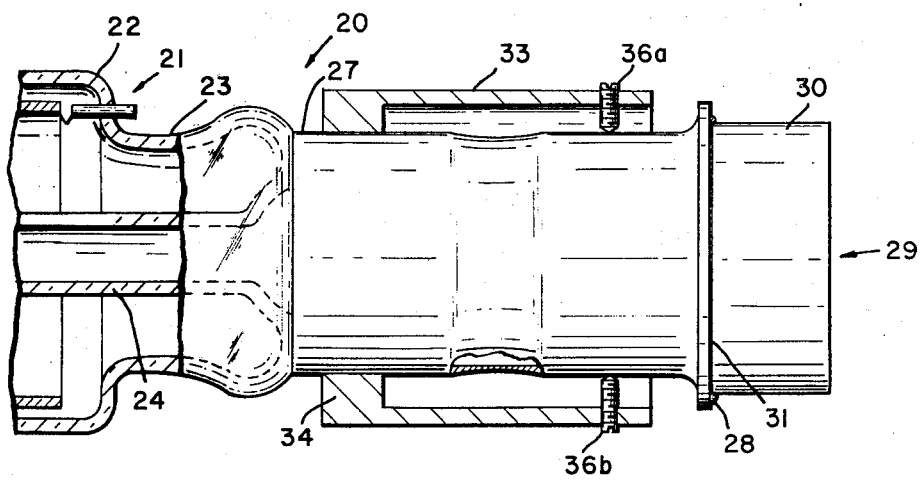
FIG. 3 is a cross-sectional view of the present invention.

Referring now to FIG. 3, a partial cross-sectional view of an adjustable mirror mount, according to the present invention, is now described. The laser 20 includes an elongated plasma tube 21 having a relatively larger diameter main body envelope portion 22 and a relatively smaller diameter anode envelope portion 23. An elongated capillary hollow discharge tube 24 is supported by the anode envelope 23. The plasma tube 21 contains an active laser gas or mixture such as He-Ne, for example. The gas is allowed to circulate within the plasma tube 21, the capillary tube 24, and through an aperture in the capillary tube 24 at the other end (not shown) of the tube 24.

The anode envelope 23 is attached to one end of an elongated member, shown here as a metal cylindrical member 27, to which the mirror 29 is mounted. The other end of the cylinder 27 may be flared for mounting the mirror 29 thereto by means of a glass frit 28 or glass solder. The wall thickness of the mid-section of the member 27 is somewhat thinner than the rest of the cylinder. This is so that the member 27 can be easily deflected along its axis for adjusting the mirror 29. The mirror 29 consists of a cylindrical glass substrate 30 having a quarter-wave filter 31, or other suitable filter deposited on one face. A quarter-wave filter 31 may be a series of coatings deposited on the glass substrate which selectively reflects the particular wavelength of the subject lasing gas. In order to seal the mirror 29 to the cylinder 27, the complete assembly, including a Brewster window (not shown) mounted within the cylinder 27, is placed into a 450° C. oven where the glass frit melts and seals the mirror 29 to the flared end of the cylinder 27.

An outer member or collar shown here as a cylinder 33 is disposed about the inner cylindrical member 27 and attached thereto by a flanged end 34. The collar 33 may be made of any suitable material which is sufficiently rigid so as not to be easily deflected. Materials such as aluminum, steel or even hard plastic may be used. The collar 33 may be attached to the inner cylindrical member 27 by welding, soldering, brazing or using an adhesive such as epoxy, for example.

The collar 33 has a plurality of adjustment screws 36a–36d, radially disposed about its circumference. Adjustment screws 36a and 36b are shown, while screws 36c and 36d are not shown but are perpendicular to the first two screws. In order to adjust the mirror 29 at the end of the inner cylinder 27, the screws are alternately tightened or loosened so as to deflect the inner cylinder 27 within its elastic limit. The outer member 33 serves several purposes; it adjusts the mirror and it also protects it from being accidently disturbed if bumped. The collar 33 may also extend beyond the mirror 29 in order to provide greater protection. Another advantage of the present invention is that the elastic limit of the inner cylinder is not exceeded and thus the laser is easier to tune or adjust.

Although the invention has been shown and described with respect to particular embodiments, nevertheless, certain changes and modifications made by one skilled in the art to which the invention pertains are deemed within the purview of the invention.

What is claimed is:

1. An adjustable mirror mount for a laser, comprising:
   a cylinder having one end attachable to a laser discharge tube and an opposite end attachable to a mirror;
   a collar disposed about said cylinder, said collar being mounted to said cylinder and extending substantially the length of said cylinder; and
   means extending from said collar and impinging upon said cylinder for deflecting said cylinder along its axis.

2. The invention according to claim 1 wherein said cylinder comprises:
   a tube having at least one portion of its length at a given wall thickness and another portion of its length at a reduced wall thickness so that said cylinder can be deflected about said portion of reduced wall thickness by said deflection means.

3. The invention according to claim 1 further comprising:
   a mirror mounted to said opposite end of said cylinder.

4. An adjustable mirror mount for a laser, comprising:
   a cylinder having first and second ends, said first end for mounting to a laser discharge tube, said second end for mounting a reflector;
   a collar having first and second ends, said collar being disposed about said cylinder and extending substantially the length of said cylinder, and mounted to said cylinder at their first ends; and
   adjustment means mounted to the second end of said collar and bearing upon said cylinder for deflecting said cylinder and thereby adjusting said mirror.

5. A laser having an adjustable mirror, comprising:
   a laser discharge tube for containing a lasing medium;
   a cylinder having first and second ends, mounted to said laser discharge tube by said first end;
   a mirror mounted to said second end of said cylinder;
   a collar mounted coaxially, by one of its two ends, to said first end of said cylinder and extending substantially the length of said cylinder; and
   a plurality of screws rotatably anchored in the other end of said collar and extending inwardly to bear upon and deflect said cylinder to thereby adjust said mirror.

6. An adjustable mirror mount for a laser, comprising:
   an inner envelope directly attachable to and in fluid communication with a laser discharge tube for mounting a mirror to one end thereof;
   a collar having first and second ends, said first end being rigidly mounted to said envelope, said collar disposed about said envelope; and
   a plurality of radially disposed lever means extending through said collar and impinging on said envelope for deflecting said envelope to thereby adjust said mirror.

* * * * *